C. B. BISHOP.
VALVE MECHANISM FOR DOOR CHECKS.
APPLICATION FILED JAN. 25, 1911.
995,217.
Patented June 13, 1911.
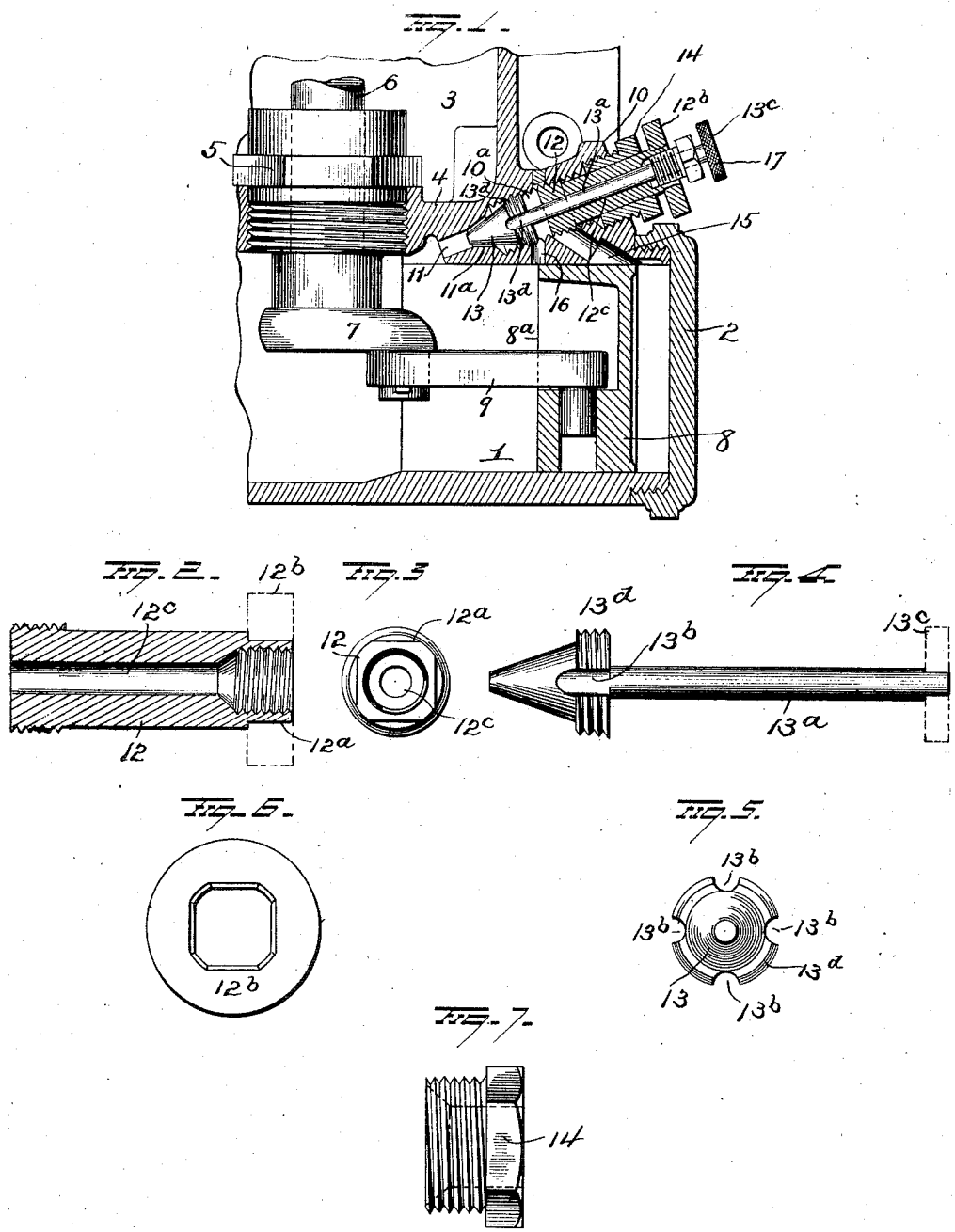

UNITED STATES PATENT OFFICE.

CHARLES B. BISHOP, OF STAMFORD, CONNECTICUT, ASSIGNOR TO THE YALE & TOWNE MANUFACTURING COMPANY, OF STAMFORD, CONNECTICUT.

VALVE MECHANISM FOR DOOR-CHECKS.

995,217.

Specification of Letters Patent. Patented June 13, 1911.

Application filed January 25, 1911. Serial No. 604,699.

*To all whom it may concern:*

Be it known that I, CHARLES B. BISHOP, of Stamford, in the county of Fairfield and State of Connecticut, have invented certain new and useful Improvements in Valve Mechanism for Door-Checks; and I do hereby declare the following to be a full, clear, and exact description of the invention, such as will enable others skilled in the art to which it appertains to make and use the same.

My invention relates to an improvement in a combination valve mechanism for controlling the closing movement of a door impelled by a spring, and employing a checking medium of air or liquid to retard its closing, and it consists of a valve chamber having ports communicating with the liquid chamber, and two valves in said valve chamber, one valve controlling the passage of the liquid to said chamber and the other controlling its escape from said chamber.

My invention further consists in the details of construction as will be more fully explained and pointed out in the claims.

In the accompanying drawings, Figure 1 is a view in section partly in elevation of a portion of the casing of a liquid door check and closer, showing my improvement applied thereto. Fig. 2 is a view in longitudinal section of the silent closing valve. Fig. 3 is an end view of same. Fig. 4 is a view in elevation of the release action valve. Fig. 5 is an end view of the latter. Fig. 6 is a view in elevation of the thumb turn for the silent closing valve, and Fig. 7 is a view of the packing nut.

1 represents the liquid chamber, 2 a screw cap closing one end of same, and 3 the spring chamber, the said chambers 1 and 3 being cast in one piece with a partition 4 between them, the said partition having a central opening therein in which the packing nut 5 is secured. This packing nut forms a bearing for the spindle 6—having a crank 7 at its lower end to which the piston 8 is connected by the rod 9. The casting is provided near one end of the liquid chamber with an enlargement or lug 10, which latter is provided with a central chamber $10^a$ terminating in an outlet port 11. This chamber $10^a$ is internally threaded for the engagement of the externally threaded portion of the valves 12 and 13, and its extreme outer end is counterbored and internally threaded for the attachment of the packing nut 14.

15 is the inlet port leading from the liquid chamber near the end thereof, rearwardly to the chamber $10^a$ for the passage of the liquid from between the advancing piston 8 and the cap 2, to said valve chamber; 11 is an outlet port leading from the valve chamber $10^a$ to liquid chamber 1, on the receding side of the piston 8, and 16 is a releasing port leading from valve chamber $10^a$ into liquid chamber 1, to permit the unobstructed flow of the liquid from chamber $10^a$ to the receding side of the piston 8, as soon as the receding edge $8^a$ of the latter has uncovered the port 16, thus suddenly releasing the pressure on the liquid in advance of the piston, and permitting the spring (not shown) to exert its full force on the spindle 6 to close the door.

The outlet port 11 is provided with a conical seat $11^a$, adapted to coact with the release valve 13, so that the escape of liquid may be shut off to a greater or lesser extent, thus regulating and controlling its escape through outlet port 11.

The silent closing valve 12 is screw threaded externally at its inner end to engage the internal threads in chamber $10^a$, and terminates outside of the lug 10, in an angular end $12^a$ to which the thumb turn $12^b$ is secured. This valve 12 is provided with a central bore $12^c$ for the passage of the shank $13^a$ of the release-action valve 13, and is counterbored and internally threaded for the packing nut 17. By rotating the valve 12 it will be moved longitudinally and as its inner end passing over the port 15, will more or less close the latter, thus regulating and controlling the escape of liquid from in front of piston 8. By means of this valve the escape of liquid can be so curtailed that the door will close with a quiet regular movement. When valve 12 is adjusted so as to nearly cover port 15, which is its position for quiet closing of the door, the release action valve 13 should be withdrawn from its seat $11^a$ sufficiently far to permit of the free and unrestricted flow of the liquid through port 11, and when the valves are so adjusted, the liquid will escape from in front of the advancing piston through port 15, into chamber $10^a$ and freely pass from the latter through the grooves $13^b$, in the threaded shoulder of valve 13, into the port 11, and from the latter into the liquid chamber on the receding side of the piston.

The release action valve 13 is as before explained provided with a shank 13ª which passes through a central bore in valve 12. The free end of the shank 13ª is made angular for the attachment of the thumb turn 13ᶜ, and the valve proper is provided with a threaded shoulder 13ᵈ, the threads of which mesh with the threads in the chamber 10ª, so that by turning the valve it will be moved longitudinally within said chamber, and control the escape of liquid through outlet port 11, and through the release action port 16.

In order to secure the release action of the door check, the valve 12 is moved outwardly so as to uncover the port 15, and valve 13 is moved inwardly toward its seat, so as to check the flow of liquid through port 11 and uncover port 16 thus checking the movement of the piston and the closing action of the door, until the rear edge of piston 8ª uncovers the releasing port 16. As soon as port 16 is opened by the passage of the piston, the liquid in chamber 10ª will then be free to escape into cylinder in rear of the piston; this release of the liquid in chamber 10ª reduces the pressure in front of the piston, and permits the spring to exert its full force to close the door. By means of the two valves and three ports the movements of the piston can be regulated and controlled so as to provide for varying speeds either steady and regular throughout its entire stroke, or a regular movement throughout the first and major part of its stroke and an accelerated movement at the finish.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters-Patent, is:—

1. The combination with a piston chamber and a piston therein, of a valve chamber adjacent one end of the piston chamber, a plurality of ports connecting the valve and piston chambers and a plurality of independently operable valves located in said valve chamber, the stem of one valve passing longitudinally through the other valve.

2. The combination with a piston chamber and a piston therein, of a valve chamber, an inlet port connecting the chambers in advance of the piston, an outlet port connecting said chambers in rear of the piston, an intermediate outlet port connecting said chambers and adapted to be covered and uncovered by the piston, and two independently operable valves in said valve chamber, one controlling one outlet port and the other the inlet port.

3. The combination with a piston chamber and a piston therein, of a valve chamber, an inlet port connecting the chambers in advance of the piston, an outlet port connecting said chambers in rear of the piston, an intermediate outlet port connecting said chambers and adapted to be covered and uncovered by the piston, and two independently operable valves in said valve chamber, one controlling one outlet port and the other the inlet port, the stem of the outlet valve passing longitudinally through the inlet valve.

4. The combination with a piston chamber and a piston therein, a valve chamber, a port leading from said piston chamber to the valve chamber, and two ports leading from the valve chamber to the piston chamber, of two independently operable valves in said chamber, one controlling the port leading to the valve chamber, and the other controlling one of the ports leading from the valve chamber, the third port adapted to be covered and uncovered by the piston.

5. The combination with a piston chamber, a piston therein, a valve chamber, and three ports connecting the two chambers, one port for the inlet of liquid to the valve chamber, the other two being outlet ports, of two threaded valves engaging threads in the valve chamber, one of said valves controlling the inlet port and the other having a conical end for controlling one outlet port, the stem of the outlet valve passing through the inlet valve and both accessible and adjustable from the outside.

6. The combination with a piston chamber, a piston therein, a valve chamber adjacent one end of the piston chamber, and three ports connecting the two chambers, one port having a conical valve seat, of two valves each externally threaded for engagement with internal threads on the wall of the valve chamber, and one having a conical head coöperating with the conical valve seat, the stem of the conical valve passing longitudinally through the other valve, both valves being accessible and independently operable from the outside.

7. The combination with a piston chamber, a piston therein, a valve chamber adjacent one end of the piston chamber, and one inlet port and two outlet ports connecting the two chambers, of a valve controlling one outlet port and having a threaded engagement with the wall of the valve chamber, the said threaded section being grooved, a valve controlling the inlet port and having threaded engagement with the wall of the valve chamber, the stem of the outlet valve passing through the inlet valve, and thumb turns on the outer end of each valve.

8. The combination with a piston chamber and a piston therein, of a valve chamber adjacent one end of the piston chamber, three ports connecting the two chambers, and two independently operable valves, one for controlling the passage through two of said ports and the other controlling the passage through the other port.

9. The combination with a piston chamber, and a piston therein, of a valve chamber, an inlet and two outlet ports connecting the two chambers, a single valve controlling the two outlet ports and an independent valve controlling the inlet port.

10. The combination with a piston chamber and a piston therein, of a valve chamber, an inlet port and two outlet ports connecting the two chambers, a single valve controlling the two outlet ports, and an independent valve controlling the inlet port, the stem of the outlet valve passing through the inlet valve and a packing for said stem.

In testimony whereof, I have signed this specification in the presence of two subscribing witnesses.

CHARLES B. BISHOP.

Witnesses:
WARREN H. TAYLOR,
CHARLES E. VAIL.